United States Patent Office.

JOHN A. McCLELLAND, OF LOUISVILLE, KENTUCKY.

*Letters Patent No.* 77,304, *dated April* 28, 1868; *reissue No.* 3,778, *dated December* 28, 1869.

DIVISION B.

IMPROVED MATERIAL FOR FORMING DENTAL PLATES.

The Schedule referred to in these Letters Patent and making part of the same.

*To all whom it may concern:*

Be it known that I, JOHN A. McCLELLAND, of Louisville, in the county of Jefferson, and State of Kentucky, have invented a new and improved Base for Dental Plates; and I do hereby declare that the following is a full, clear, and exact description of division B.

I employ collodion, prepared in the usual way, by the treatment of cotton or other vegetable fibres with sulphuric and nitric acids, and well-known solvents, but although the pyroxyline is made fully soluble, the solution need be made only of the consistency of sirup.

To the collodion is added a solution of gum-copal or other suitable resinous substances, in any desired proportion, taking care to thoroughly incorporate the ingredients of the composition.

Metallic oxides and coloring-matters may also be added to the solution, to give the material greater density, and impart the required color to imitate the natural color of the gums; and further, in order to render the material quite uninflammable, and to neutralize the combustible nature of the same, there may be also mixed with the solution, a small portion of phosphate of ammonia, or of magnesia, iodide of cadmium, or the oxalate of lime.

The composition is then, after being allowed to settle and expel all the air that it may enclose, poured out upon a flat surface, and dried by a gentle heat, which may be done in a kiln in connection with a still or retort for recovering the solvents, as described in the specification under my application, lettered division A.

The residuum will then be in the form of thin sheets, pieces, or plates.

The said sheets, pieces, or plates, are then reduced to a powder of any required degree of fineness, by grinding or cutting, after which the material is introduced into a proper mould of the dental plate and teeth, and saturated with ether and alcohol, or other suitable solvent, and subjected to pressure to force it into all the cavities of the mould.

The plate, while in its mould, is cured by a slow and moderate application of heat, commencing at about 100° Fahrenheit, and gradually rising, in the course of twenty-four hours or more, to a temperature of about 180°, in order to thoroughly dispel all traces of the solvents, and leave the material dry and solid.

But instead of forming the dental plates in this manner, by first introducing the dry-powdered material into the mould, the material may be saturated with solvents and adhesive plastic mass, and placed, in this condition, into the mould, when the subsequent treatment by pressure and evaporation of the solvents will be the same in order to cure the dental plates.

When the dry sheets or the powdered compound cannot be conveniently obtained at the time required for its use, I make a plastic mass of collodion, a resinous substance, and coloring-matter, as above described, and before this mass is dry, I introduce it into the mould and proceed as described for the comminuted material.

I do not, therefore, confine my invention to the use of the powdered material, although, for convenience and economy, I prefer to use the material in the powdered or granular state.

Pyroxyline in a pulpy condition, or only partially dissolved, so that it shall be merely softened or pulpified, has, I am aware, been employed as a plastic material to mould into various useful forms, either alone or combined with other substances.

I am also aware that collodion has been dried in sheets previously, and that it has also been combined with animal, vegetable, and mineral substances, to produce various compounds, which, in a pulpy condition, have been dried in moulds or forms, for the purpose of making various fabrics or articles of manufacture.

But I am not aware that pyroxyline or collodion, either alone or combined with any other substance, has ever been used as a base for artificial teeth or gums before my invention or discovery.

Having described my invention,

What I claim as new, and desire to secure by Letters Patent, is—

1. A base for artincial gums or dental plates, in which pyroxyline or collodion forms a component part, substantially as described.

2. A dental base, composed of a granulated compound of collodion and coloring-matter, substantially as described.

3. A dental base, composed of collodion and a resinous matter, substantially as described.

J. A. McCLELLAND.

Witnesses:

WM. M. BRIDGES,

C. M. WRIGHT.